United States Patent [19]

Sikorra

[11] 4,383,192

[45] May 10, 1983

[54] ELECTROMECHANICAL ACTUATOR

[75] Inventor: Daniel J. Sikorra, Belleair, Fla.

[73] Assignee: Honeywell Inc., Minneapolis, Minn.

[21] Appl. No.: 265,871

[22] Filed: May 21, 1981

[51] Int. Cl.³ .............................................. H02K 21/28
[52] U.S. Cl. ..................................... 310/154; 310/254
[58] Field of Search ............... 310/154, 254, 256, 260, 310/46

[56] References Cited

U.S. PATENT DOCUMENTS

| 2,717,969 | 9/1955 | Buchhold et al. ............... 310/154 X |
| 3,296,471 | 1/1967 | Cochardt . | |
| 3,422,294 | 1/1969 | Parker .............................. 310/154 X |
| 3,564,705 | 2/1971 | Cochardt . | |
| 3,828,213 | 8/1974 | Seizi et al. . | |

Primary Examiner—John Gonzales
Attorney, Agent, or Firm—George W. Field

[57] ABSTRACT

An improved permanent magnet DC motor designed to accurately support inner pole pieces between end bells to obviate the need for grinding the bore of the stator assembly, magnets and outer magnet pieces being sequentially attached to the inner poles, and the outer magnetic non-structural pieces being configured for most efficient use of a minimum weight of permeable material.

6 Claims, 6 Drawing Figures

ELECTROMECHANICAL ACTUATOR

FIELD OF THE INVENTION

This invention relates to the field of electromechanical actuators, and more particularly to permanent magnet direct current motors for use in apparatus where motor size and weight must be minimized.

BACKGROUND OF THE INVENTION

Direct current motors are known in which a plurality of magnets are positioned with their polar axes extending generally radially with respect to the axis of spin of the motor. Such motors are designed to use either electromagnets or permanent magnets for the field structure. A common feature of all such motors has been the provision of a ferromagnetic shell around the outside of the motor through which the flux of all the outwardly directed poles may pass. Various pole piece configurations have been developed, particularly for use with permanent magnets.

Motors which utilize permanent magnets such a Alnico 5, which has comparatively low intrinsic coercivity, often utilize soft iron platelets or pole shoes to prevent partial demagnetization which could otherwise occur under heavy load or reversal conditions. With permanent magnets of the barium or strontium ferrite family and also the samarium cobalt family, the added pole shoes are sometimes combined with poles in unusual configurations to achieve a higher rotor gap flux density than exists at the magnet surface. This increased rotor gap flux density is a direct motor performance factor for increased torque per ampere ratio, and is most advantageous with samarium cobalt magnets having high energy, high coercivity, but only moderately high residual flux density.

Soft iron pole shoes typically offer a further advantage during fabrication where finishing to a critical radius and concentricity is required, preferably by machining instead of grinding the hard and brittle magnet material.

The typical incorporation of soft iron pole shoes is represented in structures as shown in U.S. Pat. Nos. 3,296,471, 3,564,705 and 3,828,213 for example. The surrounding cylinder or box of ferromagnetic material serves to support the pole and magnet structure but also provides outer flux flow return between poles of opposite polarity. The thickness of the outer shell is determined by the maximum allowable flux density which occurs in the cross section between opposite poles. Much of the remainder of the outer shell operates at lower flux density and magnetic efficiency and therefore contributes to excessive weight and size for a given armature diameter. Moreover, such structures have traditionally necessitated a final grinding operation during manufacture to true up the rotor cavity, to insure the minimal required air-gap clearance.

SUMMARY OF THE INVENTION

The present invention comprises a permanent magnet D.C. motor having a stator in which the pre-machined pole pieces are accurately located by and secured to a pair of end bells rather than to a surrounding rigid iron housing, so that finish grinding or machining is not required for accurate air gap determination. The structure makes efficient use of the pole pieces to provide flux concentration at the rotor surface.

The structure also makes maximally efficient use of the outer iron because the desired outer circular shape of minimum diameter carries the integral of pole flux substantially at maximum density throughout.

Various advantages and features of novelty which characterize the invention are pointed out with particularity in the claims annexed hereto and forming a part hereof. However, for a better understanding of the invention, its advantages, and objectives obtained by its use, reference should be had to the drawing which forms a further part hereof, and to the accompanying descriptive matter, in which there is illustrated and described a preferred embodiment of the invention.

BRIEF DESCRIPTION OF THE DRAWING

In the drawing, in which like reference numerals indicate corresponding parts throughout the several views.

DESCRIPTION OF THE PREFERRED EMBODIMENT

Figure 1:
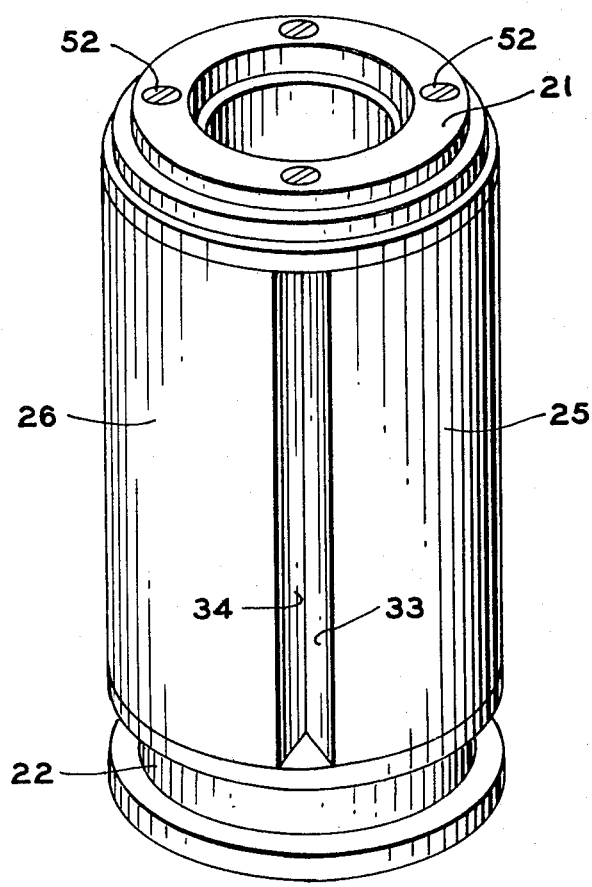
FIG. 1 is a perspective view of a motor stator according to the invention.
Figure 2:
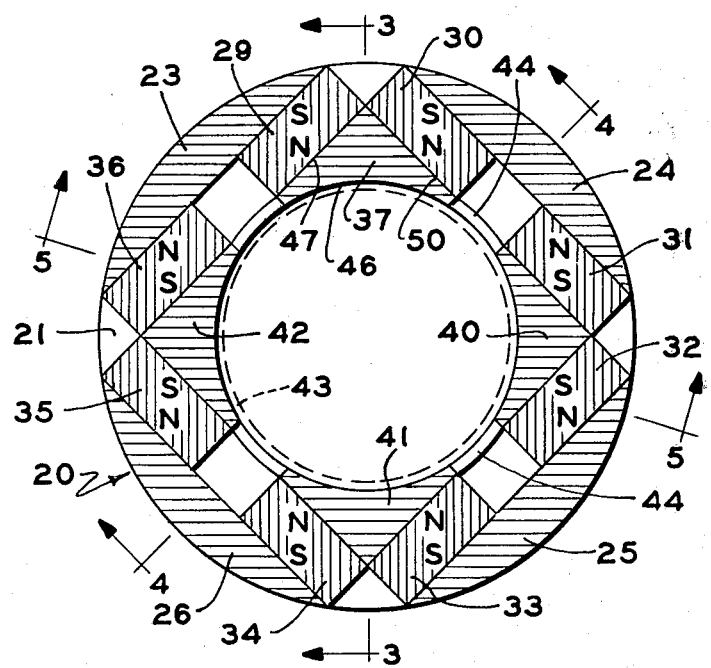
FIG. 2 is a transverse section view of the stator.
Figure 3:
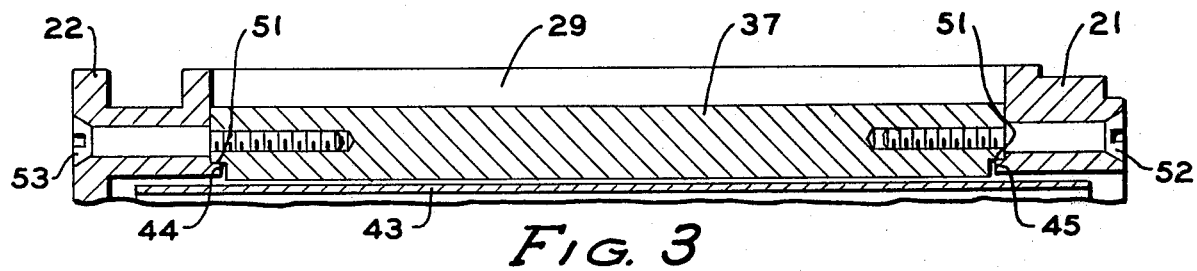
FIG. 3 is a fragmentary longitudinal section seen along the line 3—3 of FIG. 2.
Figure 4:
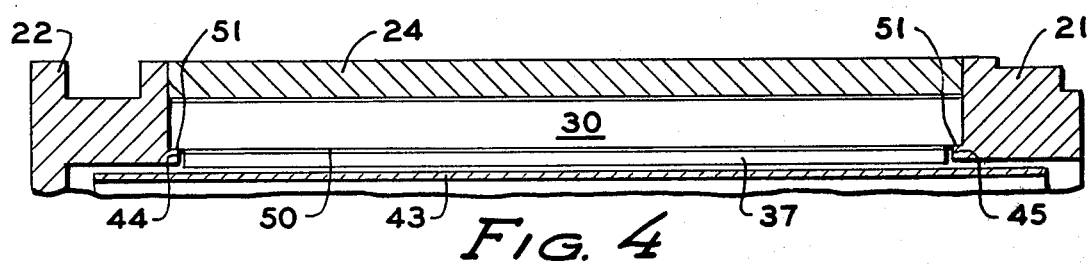
FIG. 4 is a fragmentary longitudinal section seen along the line 4—4 of FIG. 2.
Figure 5:
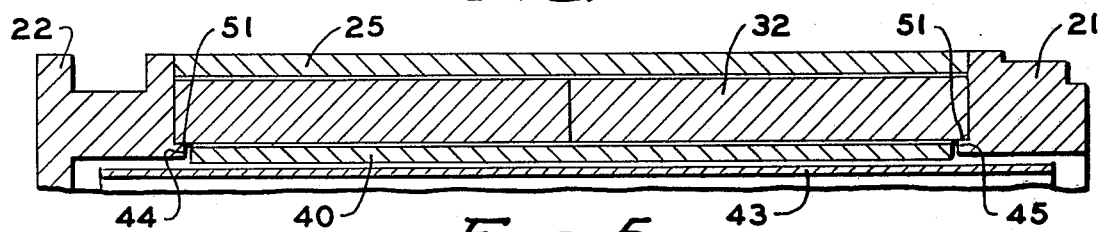
FIG. 5 is a fragmentary longitudinal section seen along the line 5—5 of FIG. 2.
Figure 6:
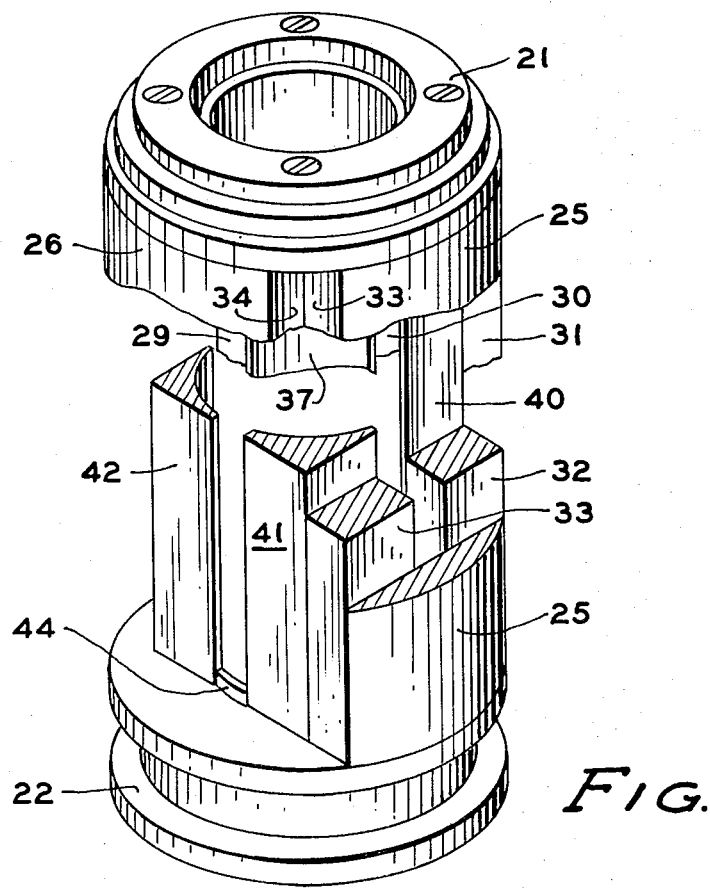
FIG. 6 is a perspective view showing how the stator is assembled, with parts broken away for clarity of illustration.

A stator 20 according to the invention comprises a pair of end bells 21 and 22, a set of four outer pole pieces 23, 24, 25, and 26, a set of eight magnets 29, 30, 31, 32, 33, 34, 35, and 36, and a set of four inner pole pieces 37, 40, 41, and 42; the armature or rotor of the motor is suggested at 43.

Bells 21 and 22 are in spaced apposition at ends of the axis of rotation of the motor. Bell 22 has a circular shoulder 44 centered on the axis, and bell 21 has a similar shoulder 45. The bells are spaced and interconnected by the inner pole pieces, which are of identical construction.

Thus pole piece 37 has an inner concave surface 46 and a pair of outer flat surfaces 47 and 50 which intersect at a dihedral angle of 90°, the vertex of the angle extending parallel to the axis. At its ends surface 46 has cutaways 51 to engage the shoulders of the bells, and pole piece 37 is secured to bells 21 and 22 by machine screws 52 and 53. Pole pieces 40, 41, and 42 are similarly constructed and mounted, so that the bells and pole pieces form a very strong and rigid assembly in which the curved surfaces form spaced peripheral portions of a first circular cylinder coaxial with the axis of the motor. The shoulders and cutaways combine to insure proper positioning of the curved surfaces so that no subsequent grinding is necessary.

Magnets 29–37 are preferably of a samarium-cobalt composition which is most readily manufactured in the form of flat rectangular plates having opposite faces which constitute the poles of the magnet. For convenience of manufacture and handling each magnet is made in two parts, in end to end abutment. Magnets 29 and 30 have their north poles in faces which are secured adhesively against surfaces 47 and 50 of pole piece 37; they do not extend beyond the vertex of the dihedral angle formed by surfaces 47 and 50, nor do they extend inwardly beyond those flat surfaces. Magnets 31 and 32 have their south poles secured to pole piece 40, magnets 33 and 34 have their north poles secured to pole piece 41, and magnets 35 and 36 have their south poles secured to pole piece 42.

The outer surfaces of the eight magnets lie in the faces of a prism having a square base: the magnets do not extend fully to the centers of the prism faces nor fully to their vertices.

Outer pole piece 23 has an inner flat surface which is secured to the south pole surface of magnet 29 and the north pole surface of magnet 36, thus completing a ferromagnetic path from pole piece 37 through magnet 29, pole piece 23, and magnet 36 to pole piece 42.

Outer pole piece 24 has an inner flat surface which is secured to the south pole surface of magnet 30 and the north pole surface of magnet 31, thus completing a ferromagnetic path from pole piece 37 through magnet 30, pole piece 24, and magnet 31 to pole piece 40.

Outer pole piece 25 has an inner flat surface which is secured to the south pole surface of magnet 33 and the north pole surface of magnet 32 thus completing a ferromagnetic path from pole piece 41 through magnet 33, pole piece 25, and magnet 32 to pole piece 40.

Outer pole piece 26 has an inner flat surface which is secured to the south pole surface of magnet 34 and the north pole surface of magnet 35, thus completing a ferromagnetic path from pole piece 41 through magnet 34, pole piece 26, and magnet 35 to pole piece 42.

Pole pieces 23-26 are secured to magnets 29-35 adhesively, so that they are supported on the magnets, which are supported on the inner pole pieces, which are supported at their ends in the end bells, this gives a rigid, unitary structure having parts which can be manufactured exactly and assembled exactly, and the resulting unit requires no grinding of the inner cylindrical surface. The rotor assembly can easily be removed from the stator assembly, if service of the rotor contained within it should become necessary. The rotor is mounted in bearings carried by end bells 21 and 22 and may be conventional or of a moving coil type, in which case an inner, non-rotating ferromagnetic core is cantilevered from one end bell.

From the above it will be evident that the invention comprises an improved permanent magnet motor designed to maximize motor performance factors in a magnetic circuit configuration which provides high rotor gap flux density from high energy and coercivity material having but moderate residual flux capability. The magnetic circuit configuration is also designed to operate the outer permeable material at a substantially constant high flux density throughout to enable a minimum overall weight and outside diameter for any given rotor diameter. It is further designed to provide for accurate assembly of fully premachined parts by locating and securing the inner pole shoes directly to the end bells to obviate the need to finish bore or grind the stator assembly.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size and arrangement of parts, within the principle of the invention, to the full extent indicated by the broad general meaning of the terms in which the appended claims are expressed.

I claim:

1. A stator for a permanent magnet motor comprising, in combination:

a pair of end bells in spaced apposition along an axis; a set of ferromagnetic inner pole pieces secured at their ends to said bells to extend therebetween parallel to said axis, said inner pole pieces having pairs of flat outer surfaces, intersecting at dihedral angles having vertices parallel to said axis, and concave inner curved surfaces comprising peripherally spaced portions of a first cylinder circular on said axis defined by angles less than the supplements of said dihedral angles; flat permanent magnets having inner poles which lie in inner surfaces secured to the flat outer surfaces of said inner pole pieces, said magnets further having outer poles lying in outer surfaces which compose the faces of a prism of rectangular polygonal cross section normal to said axis, said outer faces terminating short of the centers of said faces;

and a set of ferromagnetic outer pole pieces having inner flat surfaces secured to the outer flat surfaces of said magnets, each of said outer pole pieces engaging one flat outer surface of each of two peripherally adjacent magnets to complete a ferromagnetic path from a first inner pole piece through a first magnet, an outer pole piece, and a second magnet to a second inner pole piece, by bridging a gap between said first and second magnets at surfaces of opposite polarity.

2. A stator assembly according to claim 1 in which there are four poles, four inner pole pieces and four outer pole pieces, and in which the dihedral angles are 90° and the polygon is a square.

3. A stator according to claim 1 in which the outer surfaces of said outer pole pieces are portions of a second cylinder coaxial with said first cylinder, and said inner flat surfaces of said outer pole pieces extend substantially to said second cylinder.

4. A stator according to claim 1 in which said magnets are of rare earth cobalt.

5. A stator of claim 1 in which magnets are adhesively secured to said inner and outer pole pieces.

6. A stator according to claim 1 in which said bells include raised circumferential shoulders concentric about said axis, and the ends of said inner pole pieces are configured to conform with said shoulders to position said inner curved surfaces on said first cylinder.

* * * * *